United States Patent [19]
Eckberg

[11] Patent Number: 5,500,300
[45] Date of Patent: Mar. 19, 1996

[54] SILICONE FLUIDS HAVING CHLOROALKYL AND EPOXY GROUPS AND PHOTOCURABLE SILICONE COATING COMPOSITIONS

[75] Inventor: Richard P. Eckberg, Saratoga Springs, N.Y.

[73] Assignee: General Electric Company, Waterford, N.Y.

[21] Appl. No.: 443,945

[22] Filed: May 18, 1995

[51] Int. Cl.$^6$ .......................... B32B 27/06; B32B 27/30; B32B 27/32

[52] U.S. Cl. .............................. 428/447; 528/19; 528/21; 528/23; 528/27

[58] Field of Search ..................... 428/447; 528/19, 528/21, 23, 27

[56] References Cited

U.S. PATENT DOCUMENTS

| | | | |
|---|---|---|---|
| 4,264,703 | 4/1981 | Crivello | 430/270 |
| 4,421,904 | 12/1983 | Eckberg et al. | 528/27 |
| 4,640,967 | 2/1987 | Eckberg | 528/15 |
| 4,882,201 | 11/1989 | Crivello et al. | 522/15 |
| 4,927,158 | 5/1990 | Lierman | 273/268 |
| 4,981,881 | 1/1991 | Crivello et al. | 522/31 |
| 5,178,959 | 1/1993 | Eckberg et al. | 528/15 |
| 5,227,410 | 7/1993 | Eckberg et al. | 522/75 |
| 5,240,971 | 8/1993 | Eckberg et al. | 522/31 |
| 5,258,480 | 11/1993 | Eckberg et al. | 528/15 |

*Primary Examiner*—Robert E. Sellers

[57] ABSTRACT

Photocurable silicone compositions are provided which utilize an epoxy functional silicone fluid having chloroalkyl radicals attached to silicon by carbon-silicon bonds. Cure of the epoxy functional silicone fluid is achieved with a photodecomposable diaryliodonium hexafluoro(Group VA.) salt such as diphenyliodoniumhexafluoroantimonate. The photocurable silicone compositions can be applied and photocured on to various substrates, such as a thermoplastic substrate as a release coating.

8 Claims, No Drawings

SILICONE FLUIDS HAVING CHLOROALKYL AND EPOXY GROUPS AND PHOTOCURABLE SILICONE COATING COMPOSITIONS

BACKGROUND OF THE INVENTION

The present invention relates to photocurable silicone fluid compositions having an enhanced rate of photocure. More particularly, the present invention relates to polydiorganosiloxane fluids having chloroalkyl radicals and epoxyalkyl radicals attached to silicon by carbon-silicon bonds; the fluids exhibit improved compatability with polyarylhexafluoro onium salt photocatalysts, such as diaryliodoniumhexafluoro(Group VA.) salts when applied onto an appropriate substrate; these photocurable silicone fluid compositions can form valuable release coatings when photocured.

Epoxy functionalized polydiorganosiloxane fluids have been found useful for imparting improved release characteristics to various substrates, such as glass, plastic, or paper, when applied and cured thereon as shown by U.S. Pat. Nos. 4,421,904 and 4,927,158. Epoxy functionalized fluorosilicones, are shown by Eckberg et al U.S. Pat. No. 5,178,959, when photocured, are solvent-resistant coatings. Epoxy functionalized polydiorganosiloxane fluids can be photocured using a diaryliodonium salt, or "onium salt" catalyst. Experience has shown however, that the onium salt catalyst and epoxy functionalized polydiorganosiloxane fluid are often incompatible.

As taught in U.S. Pat. No. 4,264,703, compatability between an aromatic iodonium salts, such as diphenyliodoniumhexafluoroantimonate, and an epoxy functionalized silicone fluid can be enhanced, if the diaryliodonium salt has aryl radicals substituted with from 1–4 $C_{(4-20)}$ organo radicals. An additional method for enhancing onium salt- epoxy functionalized silicone fluid miscibility is by incorporating polyether blocks in the epoxy functionalized silicone fluid backbone, as shown in U.S. Pat. Nos. 5,227,410 and 5,240,971. However, the photocure efficiency of the resulting curable silicone mixture is sometimes adversely affected, as a result of the basicity of the incorporated polyether groups.

The present invention is based on the discovery that improved compatability between the onium salt and the epoxy functionalized silicone fluid can be achieved while avoiding a photocure response reduction, if the epoxy functionalized silicone fluid also incorporates an effective amount of chemically combined siloxy units having chloroalkyl radicals attached to silicon by carbon-silicon bonds. Surprisingly, the chloroalkyl modified epoxy functionalized silicone fluid also does not experience a significant denigration of release performance after it has been photocured on an appropriate substrate.

STATEMENT OF THE INVENTION

There is provided by the present invention, a photocurable silicone composition comprising, (A) an organopolysiloxane fluid having a MW in the range of about 500 to about 50,000, which has 0.1% to 50% by weight of chemically combined chlorine, and an epoxy equivalent weight in the range of about 300 to about 8000, which organopolysiloxane fluid is substituted with $C_{(1-13)}$ organo radicals attached to silicon by carbon-silicon bonds and consists essentially of a mixture of chemically combined diorganosiloxy units selected from the group consisting of (i) diorganosiloxy units free of epoxy functional groups and chloroalkyl groups, (ii) diorganosiloxy units containing epoxy functional groups, and (iii) diorganosiloxy units having at least one $C_{(1-4)}$ chloroalkyl radical attached to silicon by carbon-silicon bonds,, and (B) an amount of a photodecomposable diaryliodonium hexafluoro(Group VA.) salt which is sufficient upon photodecomposition to acid catalyze the cure of the photocurable silicone composition.

In another aspect of the present invention, there is provided an organopolysiloxane fluid having a MW in the range of about 500 to about 50,000, which has 0.1% to 50% by weight of chemically combined chlorine, and an epoxy equivalent weight in the range of about 300 to about 8000, which organopolysiloxane fluid is substituted with $C_{(1-13)}$ organo radicals attached to silicon by carbon-silicon bonds and consists essentially of a mixture of chemically combined diorganosiloxy units selected from the group consisting of (i) diorganosiloxy units free of epoxy functional groups and chloroalkyl groups, (ii) diorganosiloxy units containing epoxy functional groups, and (iii) diorganosiloxy units having at least one $C_{(1-4)}$ chloroalkyl radical attached to silicon by carbon-silicon bonds.

DETAILED DESCRIPTION OF THE INVENTION

Some of the $C_{(1-13)}$ organo radicals which can be attached to silicon by carbon-silicon bonds in the backbone of the organopolysiloxane fluid are for example $C_{(1-8)}$ alkyl radicals such as methyl, ethyl, propyl, butyl and pentyl; cyanoalkyl such as cyanoethyl, cyanopropyl. Also included are $C_{(6-13)}$ aryl radicals such as phenyl, tolyl, xylyl and naphthyl. Among the $C_{(1-4)}$ chloroalkyl radicals attached to silicon there are included chloromethyl, which is preferred, chloroethyl, chloropropyl and chlorobutyl.

Suitable olefin epoxides which can be used to incorporate epoxy functionality into the organopolysiloxane fluid by SiH addition are for example, limoneneoxide, 4-vinylcyclohexene oxide, (VCHO), which is preferred, allylglycidylether, glycidylacrylate, 7-epoxyoctene, and vinylnorborene monoxide.

Among the preferred diarylhexafluoroonium salts which can be used in the practice of the invention, are diarylhexafluoroonium salts having at least one —OR group attached to an aryl radical, where R is a $C_{(8-20)}$ alkyl radical. For example, there are included diaryliodoniumhexafluoro-(Group VA.) salts, such as (4-octyloxyphenyl)phenyliodoniumhexafluoroantimonate, and (4-decyloxyphenyl)phenyliodoniumhexafluorophosphate. Other iodonium types of diaryliodoniumhexafluoro(Group VA.) salts are bis(4-dodecylphenyl)iodoniumhexafluoro arsenate. Further examples of suitable diarylhexafluoroonium salts and their syntheses are shown by U.S. Pat. Nos. 4,882,201 and 4,981,881 which are incorporated herein by reference.

The photocurable silicone compositions of the present invention can be made by combining the diarylhexafluoroonium salt or "onium salt" and the organopolysiloxane fluid which hereinafter will mean the above referenced fluid having the afore-described MW, and recited range of epoxy and chloroalkyl functional groups. An effective amount of the diarylhexafluoroonium salt is from about 0.01% to 20% by weight based on the weight of the photocurable silicone composition, and preferably 0.1% to 10% by weight.

The organopolysiloxane fluid or referred to hereinafter sometimes as the "epoxy fluid" or "chloromethyl fluid", which can be combined with the onium salt catalyst to form the photocurable silicone composition, is preferably made using in part, some of the procedures shown by Eckberg et al U.S. Pat. No. 5,258,480 which is incorporated herein by reference. A preferred technique, for example, is to initially synthesize a chloroalkylsiloxane cohydrolyzate consisting essentially of chloroalkylorganosiloxy units and diorganosiloxy units, by cohydrolzing the appropriate respective halosilanes. The chloroalkylsiloxane cohydrolyzate can then be equilibrated with a polyorganohydrogen siloxane, and an appropriate source of end stopping siloxy units, such as $R^1(R)_2SiO_{1/2}$, where $R^1$ is selected from H or R and R is a $C_{(1-13)}$ organo radical as defined above and an additional source of diorganosiloxy units, such as a cyclic polydiorganosiloxane, to produce an "SiH organopolysiloxane precursor" having chemically combined chloroalkylorganosiloxy units, SiH containing organosiloxy units, and diorganosiloxy units. Incorporation of epoxy functional groups into the SiH organopolysiloxane precursor can then proceed in accordance with the method shown by U.S. Pat. No. 5,258,480 using an olefin epoxide, such as VCHO, in the presence of an appropriate hydrosilation catalyst, such as $RhCl_3[(CH_3(CH_2)_3)_2S]_3$ and a tertiary amine such as methyldicocoamine.

Substrates which can be coated in accordance with the practice of the invention are for example, thermoplastic substrates such as polystyrene, polyethylene, polypropylene, polyvinylchloride, polyvinylidine chloride, polycarbonate, polyphenylene oxide, polysulfone, polyethylene terephthalate, cellulose acetate, polyvinylalcohol; metal substrates such as aluminum, iron, steel, copper, brass, gold, platinum, nickel and chromium. In addition, glass and paper substrates also can be treated.

Application of the photocurable silicone composition onto a substrate can be achieved by roll coating, curtain coating, dip coating, 3 roll ofsett gravure coating, multiroll film-splitting coating, knife coating, printing, and off-set printing.

In order that those skilled in the art will be better able to practice the present invention, the following examples are given by way of illustration and not by way of limitation. All parts are by weight unless otherwise indicated.

EXAMPLE 1

A solution of 392 g (2.4 mole) of chloromethyl-methyldichlorsilane and 309 g (2.4 mole) of dimethyldichlosilane in 800 g of isopar E aliphatic solvent was slowly added to 1300 g of water at 10° C. over a 90 minute period. After agitating at 25° C. for an hour, the organic phase was separated, washed twice with water, treated with anhydrous sodium sulfate, filtered, and stripped of solvent under mild heat. There was obtained 402 g of a clear dimethylsiloxanechloromethyl(methyl)siloxane hydrolyzate.

A mixture of 20 g of the above hydrolyzate, 10 g of a trimethylsiloxy-stopped linear polymethylhydrogensiloxane, 4 g of tetramethyldisiloxane, and 166 g of octamethylcyclotetrasiloxane. The mixture was equilibrated at 75° C. in the presence of 0.27 g of trifluoromethanesulfonic acid over a five hour period. The mixture was neutralized and filtered to provide 190 g of a clear fluid organopolysiloxane terpolymer having 1262 ppm of H as SiH groups based on FTIR analysis.

A mixture of 100 g of the above organopolysiloxane terpolymer in 50 g of Isopar L aliphatic hydrocarbon solvent, 16 g of 4-vinylcyclohexeneoxide (VCHO), 0.01 g of dimethylcocoamine stabilizer and 0.05 g of a 5% solution of $RhCl_3[(CH_3(CH_2)_3)_2S]_3$ hydrosilation catalyst was heated for 5 hours. The mixture was stripped of volatile components at 155° C. in vacuo. Based on method of preparation, there was obtained 104.5 g of polydiorganosiloxane fluid, referred to hereinafter as the "chloromethyl fluid" which consisted essentially of about 7.5 mole percent of epoxy functional diorganosiloxy units, about 2.5 mole percent of chloromethyl functional diorganosiloxy units and about 90 mole percent of dimethylsiloxy units; it had a 568 cstk viscosity; $"D^{25} = 1.4218$, 98.6% solids (45 minute weight loss at 150° C.). The theoretical Epoxy Equivalent Weight (EEW) of the chloromethyl fluid is 916; EEW found by potentiometric titre was 1000.

UV curable "chloromethyl A" was prepared by incorporating 2 parts of "onium salt catalyst A", into 100 parts of the above chloromethyl fluid, where onium salt catalyst A is a 50% solution of (octyloxyphenyl)phenyliodoniumhexafluoroantimonate and 2.6% of isopropylthioxanthone in an alkylglycidylether. UV curable "chloromethyl B" was prepared following the same procedure, using 2 parts of "onium salt catalyst B" which is a 45% solution of bis(4-dodecylphenyl)iodoniumhexafluoroantimonate and 2 wt % isopropylthioxanthone sensitizer in an alkylglycidylether.

Control UV curable mixtures "control A and B" were also prepared following the same procedure, except that an epoxy functional polydiorganosiloxane fluid was used having an epoxy equiv. wt. of 1000 and which was free of chloromethyl radicals.

The four UV curable mixtures, chloromethyl A and B, and control A and B, were evaluated for coating bath integrity, and for photocure response. It was found that catalyst separation occured with control A after it stood for about an hour, while chloromethyl A formed a hazy stable suspension. Although chloromethyl B and control B appeared to be stable coating baths, chloromethyl B appeared to be a slightly hazy solution, while control B resulted in a hazy suspension.

The curing performance of the four UV curable mixtures were evaluated by using a manual adhesive coater to apply the mixtures as 0.5 mil thick coatings to PEK (polyethlene kraft) liner. The coated substrates were then passed through an RPC model QC 1202 Lab UV Processor equipped with two Hanovia medium pressure mercury vapor lamps. The lamps were could be operated at 100, 200, or 300 watts/inch along with a conveyer line speed controllable between 10 and 500 fpm. The minimum UV fluxes required to cure the respective 0.5 mil thick coatings were then determined as well as cure characteristics of the resulting films. The following results were obtained:

| COATINGS | WEB LINE SPEED | LAMP POWER | REMARKS |
| --- | --- | --- | --- |
| chloromethyl A | 400 fpm | 200 watt/ in | no migration, no smear |
| control A | 200 fpm | 600 watt/ in | slight migration |
| chloromethyl B | 400 fpm | 200 watt/ in | no migration, slight smear |
| control B | 400 fpm | 300 watt/ in | slight migration |

The above results show that the control compositions free of chloromethyl radicals require higher lamp power to effect cure and result in inferior coatings.

Chloromethyl B and Control B were then tested for Gel time with a GelPointe photocure tester in isothermal runs at 60° C. Five gel time measurements were made. Chloromethyl B showed an average gel time of 52.8 seconds, while Control B showed an average response time of 67.9 seconds.

Chloromethyl B and Control B were then coated on polyethylene craft liner (PEK) to a weight of about 0.8 g/m$^2$ using a Euclid mechanical lab coater. The coated liners were then passed through an RPC UV processor at 100 ft/min× 400 watt/in total lamp power to insure complete cure. The cured silicone coatings were laminated with TESA 7574 acrylic test tape. The laminates were aged at 70° C. for 20 hours. The laminates were then pulled at 75 in/min at <180° C. Chloromethyl B required a release force of 65 g/in, while the control separated at 60 g/in.

EXAMPLE 2

In accordance with the procedure of example 1, a mixture of 100 g of the dimethylsiloxane-chloromethyl(methyl)siloxane hydrolyzate and 1.52 g of sym-tetramethyldisiloxane was equilibrated. Upon devolitalization, there was obtained a 614 cstk polysiloxane fluid consisting of chemically combined chloromethyl(methyl)siloxy units and dimethylsiloxy units and terminated with dimethylhydrogensiloxy units. Based on input stoichiometry and Sit content, the fluid was $M^h D'_{46} D_{46} M^h$, where $M^h$ is a terminal siloxy unit, D′ is a chloromethyl(methyl) siloxy unit and D is a dimethylsiloxy unit.

In accordance with the procedure of example 1, 72 g of the above polysiloxane fluid was reacted with 3 g of VCHO to form an epoxy terminated chloromethyl(methyl)dimethylsiloxane copolymer fluid having a viscosity of 818 cstk and an epoxy equiv. wt. of 4000.

A UV curable blend (Chloromethyl C) was prepared using 2 parts of a mixture of bis(4-dodecylphenyl)iodonium-hexafluoroantimonate and 2 wt % isopropylthioxanthone sensitizer in an alkylglycidylether with 100 parts of the above epoxy terminated chloromethyl(methyl)siloxane fluid. A UV curable control blend was also made using 100 parts of a substantially similar epoxy terminated fluid having an epoxy equiv. wt. of about 4000 which was free of chloromethyl(methyl )siloxy units.

The control composition was found to be an unstable hazy suspension, and the iodonium catalyst settled out. In contrast, Chloromethyl C was found to be a clear solution. In addition, 0.5 mil cured coatings were readily prepared from Chloromethyl C which were smear and migration free upon 1 pass through a UV Cure Processor at 100 fpm under 600 watts/inch lamp power. However, the control composition required 4 passes at 20 fpm under a 600 watt/inch lamp. In addition, valuable physical properties were shown from the cured Chloromethyl C test samples, while reproducible physicals could not be measured from the control samples due to incomplete cure. These results show that the UV curable compositions of the present invention are also useful as encapsulants in to release coatings.

What is claimed is:

1. A composite of a thermoplastic substrate and a cured silicone film resulting from the treatment of the thermoplastic substrate with comprising a photocurable silicone composition followed by a UV cure comprising
    (A) an organopolysiloxane fluid having a molecular weight of from about 500 to about 50,000, containing from 0.1% to 50% by weight of chemically combined chlorine, and possessing an epoxy equivalent weight of from about 300 to about 8000, wherein the organopolysiloxane fluid is substituted with $C_{1-13}$ organo radicals attached to silicon by carbon-silicon bonds consisting essentially of a mixture of diorganosiloxy units selected from the group consisting of (i) diorganosiloxy units free of epoxy functional groups and chloroalkyl groups, (ii) diorganosiloxy units containing epoxy groups, and (iii) diorganosiloxy units having at least one $C_{1-4}$ chloroalkyl radical attached to silicon by carbon-silicon bonds, and
    (B) an amount of a photodecomposable diaryliodonium hexafluoro (Group VA) salt sufficient upon photodecomposition to acid catalyze the cure of the photocurable silicone composition.

2. A photocurable silicone composition in accordance with claim 1, where the organopolysiloxane fluid consists essentially of chemically combined dimethylsiloxy units, chloromethyl(methyl)siloxy units and 4-dimethylenecyclohexenedioxide(methyl)siloxy units.

3. A photocurable silicone composition in accordance with claim 1, where the diaryliodonium hexafluoro(Group VA.) salt is a diphenyliodoniumhexafluoroantimonate.

4. A photocurable silicone composition in accordance with claim 3, where the diphenyliodoniumhexafluoroantimonate is bis(4-dodecylphenyl)iodonium-hexafluoroantimonate.

5. A photocurable silicone composition in accordance with claim 3, where the diphenyliodoniumhexafluoroantimonate is (4-octyloxyphenyl)phenyliodonium-hexafluoroantimonate.

6. A photocurable silicone composition in accordance with claim 3, where the diphenyliodoniumhexafluoroantimonate is used in combination with a sensitizer.

7. A photocurable silicone composition in accordance with claim 6, where the sensitizer is isopropylthioxanthone.

8. An organopolysiloxane fluid in accordance with claim 5, which consists essentially of chemically combined dimethylsiloxy units, chloromethyl(methyl)siloxy units and 4-dimethylenecyclohexenedioxide (methyl)siloxy units.

* * * * *